United States Patent
Kobayashi et al.

(10) Patent No.: US 7,008,891 B2
(45) Date of Patent: Mar. 7, 2006

(54) CRYSTALLIZED GLASS FOR OPTICAL FILTER SUBSTRATE, AND OPTICAL FILTER

(75) Inventors: Tomoyuki Kobayashi, Yokohama (JP); Kei Maeda, Yokohama (JP); Motoyuki Hirose, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/724,082

(22) Filed: Dec. 1, 2003

(65) Prior Publication Data

US 2004/0116268 A1    Jun. 17, 2004

Related U.S. Application Data

(63) Continuation of application No. PCT/JP02/02780, filed on Mar. 22, 2002.

(30) Foreign Application Priority Data

May 29, 2001 (JP) ............................. 2001-160126

(51) Int. Cl.
*C03C 10/10* (2006.01)
*C03C 3/091* (2006.01)
*C03C 3/085* (2006.01)
*C03C 3/083* (2006.01)
*B32B 17/06* (2006.01)

(52) U.S. Cl. .............. 501/6; 501/68; 501/69; 501/70; 501/73; 428/426

(58) Field of Classification Search .................. 501/68, 501/69, 70, 73, 6; 428/426
See application file for complete search history.

(56) References Cited

U.S. PATENT DOCUMENTS

| | | | |
|---|---|---|---|
| 4,310,595 A | 1/1982 | Beall et al. | |
| 6,383,645 B1 * | 5/2002 | Goto et al. | ................. 428/426 |

FOREIGN PATENT DOCUMENTS

| | | |
|---|---|---|
| EP | 1 078 896 | 2/2001 |
| JP | 56-149344 | 11/1981 |
| JP | 59-223249 | 12/1984 |
| JP | 7-234315 | 9/1995 |

\* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

A crystallized glass for an optical filter substrate, which has an average linear expansion coefficient $\alpha_L$ of from $95 \times 10^{-7}/°C$. to $130 \times 10^{-7}/°C$. at from $-30°C$. to $70°C$. and which has a crystal or the like of $Na_{4-x}K_xAl_4Si_4O_{16}$ ($1 < x \leq 4$) precipitated therein. Further, a crystallized glass for an optical filter substrate, which comprises from 35 to 60% of $SiO_2$, from 10 to 30% of $Al_2O_3$, from 1 to 15% of $TiO_2+ZrO_2$, from 4 to 20% of $Na_2O$, from 4 to 20% of $K_2O$, from 0.1 to 10% of $CaO+SrO+Bao$, from 0 to 10% of $MgO$, etc., and which has $\alpha_L$ of from $95 \times 10^{-7}/°C$. to $130 \times 10^{-7}/°C$. and which has a crystal or solid solution precipitated therein.

26 Claims, No Drawings

CRYSTALLIZED GLASS FOR OPTICAL FILTER SUBSTRATE, AND OPTICAL FILTER

BACKGROUND OF THE INVENTION

1. Field of the Invention

The present invention relates to a crystallized glass to be used for a substrate for an optical filter such as a band pass filter to be used for a wavelength division multiplexing (WDM) optical communication system, and an optical filter.

2. Discussion of Background

In the WDM optical communication system, a band pass filter is required which is capable of selectively transmitting a light within a specific wavelength range, for example, a light of a specific wavelength of from 1530 to 1620 nm. As such a band pass filter, a band pass filter having a dielectric multilayer film formed on a substrate such as a glass substrate or a crystallized glass substrate, is used.

The above-mentioned dielectric multilayer film is a film in which a thin film of high refractive index dielectric such as $TiO_2$ or $Ta_2O_5$ and a thin film of a low refractive index dielectric such as $SiO_2$ are alternately laminated, and it is typically a multilayer film of about 100 layers.

A substrate to be used for such a band pass filter is required to have an average linear expansion coefficient $\alpha_L$ at from $-30°$ C. to $70°$ C. within a range of from $95 \times 10^{-7}/°$ C. to $130 \times 10^{-7}/°$ C. in order to compensate a change by temperature of the refractive index of the dielectric multilayer film thereby to suppress a change by temperature of the wavelength passing through the band pass filter.

A glass ("conventional glass") having a composition comprising, as represented by mol %, 47.3% of $SiO_2$, 24.2% of $TiO_2$, 15.6% of $Na_2O$, 6.3% of $K_2O$, 4.6% of $Li_2O$, 1.8% of BaO and 0.2% of MgO, has its $\alpha_L$ being $101 \times 10^{-7}/°$ C., and is used as a substrate for a band pass filter.

However, a glass substrate made of such a conventional glass has had a problem that warpage of the substrate at the time of film formation is large. This is considered to be attributable to the fact that the Young's modulus (hereinafter referred to as E) of the conventional glass has a small value at a level of 83 GPa. Accordingly, a substrate having larger E is desired.

As a substrate to solve this problem, a crystallized glass substrate has been proposed which is made of a crystallized glass (hereinafter referred to as the conventional crystallized glass) having a composition comprising, as represented by mol %, 74.1% of $SiO_2$, 4.0% of $Al_2O_3$, 0.6% of $ZrO_2$, 1.2% of $K_2O$, 18.1% of $Li_2O$, 1.1% of MgO, 0.4% of ZnO and 0.4% of $P_2O_5$ and having a lithium disilicate crystal precipitated therein. This conventional crystallized glass has $\alpha_L$ of $111 \times 10^{-7}/°$ C. and E of 96 GPa.

The crystallized glass substrate made of the conventional crystallized glass is one which solves the problems relating to $\alpha_L$ and E, but has had a problem that adjustment of the film-forming conditions is difficult as compared with the case where a multilayer film is formed on a glass substrate made of the conventional glass.

It is an object of the present invention to provide a crystallized glass for an optical filter substrate and an optical filter, which solve the above-mentioned problems.

DISCLOSURE OF THE INVENTION

The present invention is characterized by having the following constructions.

(1) A crystallized glass for an optical filter substrate, which has an average linear expansion coefficient $\alpha_L$ of from $95 \times 10^{-7}/°$ C. to $130 \times 10^{-7}/°$ C. at from $-30°$ C. to $70°$ C. and which has a crystal or solid solution of $Na_{4-x}K_xAl_4Si_4O_{16}$ ($1<x\leq 4$) precipitated therein (hereinafter referred to as the first crystallized glass).

(2) The crystallized glass for an optical filter substrate according to (1), which consists, as represented by mol % based on the following oxides, essentially of:
  $SiO_2$: 30 to 65%,
  $Al_2O_3$: 5 to 35%,
  $TiO_2+ZrO_2$: 1 to 15%,
  $Na_2O$: 0 to 30%,
  $K_2O$: 5 to 30%,
  $Li_2O$: 0 to 15%,
  MgO: 0 to 15%,
  CaO: 0 to 15%,
  SrO: 0 to 15%,
  BaO: 0 to 15%,
  ZnO: 0 to 15%,
  $B_2O_3$: 0 to 15%,
  $P_2O_5$: 0 to 15%,
  $Y_2O_3$: 0 to 15%.

(3) A crystallized glass for an optical filter substrate, which consists, as represented by mol % based on the following oxides, essentially of:
  $SiO_2$: 35 to 60%,
  $Al_2O_3$: 10 to 30%,
  $TiO_2+ZrO_2$: 1 to 15%,
  $Na_2O$: 4 to 20%,
  $K_2O$: 4 to 20%,
  $CaO+SrO+BaO$ 0.1 to 10%,
  MgO: 0 to 10%,
  $B_2O_3$: 0 to 10%,
  $P_2O_5$: 0 to 10%, and which has an average linear expansion coefficient $\alpha_L$ of from $95 \times 10^{-7}/°$ C. to $130 \times 10^{-7}/°$ C. at from $-30°$ C. to $70°$ C. and which has a crystal or solid solution precipitated therein (hereinafter referred to as the second crystallized glass).

(4) The crystallized glass for an optical filter substrate according to (1), (2) or (3), which has an average linear expansion coefficient $\alpha_H$ of from $80 \times 10^{-7}/°$ C. to $155 \times 10^{-7}/°$ C. at from $190°$ C. to $220°$ C.

(5) The crystallized glass for an optical filter substrate according to any one of (1) to (4), wherein $\alpha_H$ is from $110 \times 10^{-7}/°$ C. to $145 \times 10^{-7}/°$ C.

(6) The crystallized glass for an optical filter substrate according to any one of (1) to (5), which has a Young's modulus of at least 85 GPa.

(7) The crystallized glass for an optical filter substrate according to any one of (1) to (6), which has an absorptivity coefficient of at most 0.03 $mm^{-1}$ for a light having a wavelength of 1550 nm.

(8) An optical filter comprising an optical filter substrate made of the crystallized glass for an optical filter substrate as defined in any one of (1) to (7), and a dielectric multilayer film formed on the substrate.

The present inventors have considered that the cause for the difficulty in adjusting the film forming conditions for the crystallized glass substrate made of the conventional crystallized glass resides in a difference in the expansion characteristics at a temperature of at least $70°$ C. between the conventional crystallized glass and the conventional glass, and have arrived at the present invention.

BEST MODE FOR CARRYING OUT THE INVENTION

The crystallized glass in the present invention is one having a crystal or solid solution present in glass, and the presence of such a crystal or solid solution can be examined by a known X-ray diffraction method.

The composition of the crystallized glass in the present invention is an average composition including the crystal or solid solution precipitated in the crystallized glass.

The crystallized glass for an optical filter substrate of the present invention (hereinafter referred to as the crystallized glass of the present invention) is a crystallized glass to be used for a substrate for an optical filter such as a band pass filter.

The crystallized glass of the present invention has $\alpha_L$ of from $95 \times 10^{-7}/°$ C. to $130 \times 10^{-7}/°$ C., whereby the crystallized glass of the present invention can be used for a substrate of e.g. a band pass filter for a WDM optical communication. $\alpha_L$ is preferably from $100 \times 10^{-7}/°$ C. to $120 \times 10^{-7}/°$ C.

The average linear expansion coefficient $\alpha_{70}$ at from 70° C. to 100° C. of the crystallized glass of the present invention is preferably from $95 \times 10^{-7}/°$ C. to $125 \times 10^{-7}/°$ C. Here, $\alpha_{70}$ of the conventional glass is $105 \times 10^{-7}/°$ C.

The average linear expansion coefficient $\alpha_{100}$ at from 100° C. to 140° C. of the crystallized glass of the present invention is preferably from $110 \times 10^{-7}/°$ C. to $135 \times 10^{-7}/°$ C. Here, $\alpha_{100}$ of the conventional glass is $127 \times 10^{-7}/°$ C.

The average linear expansion coefficient $\alpha_{140}$ at from 140° C. to 190° C. of the crystallized glass of the present invention, is preferably from $115 \times 10^{7}/°$ C. to $140 \times 10^{-7}/°$ C. Here, $\alpha_{140}$ of the conventional glass is $135 \times 10^{-7}/°$ C.

The average linear expansion coefficient $\alpha_H$ at from 190° C. to 220° C. of the crystallized glass of the present invention is preferably from $80 \times 10^{-7}/°$ C. to $155 \times 10^{-7}/°$ C., more preferably from $80 \times 10^{-7}/°$ C. to $150 \times 10^{-7}/°$ C., particularly preferably from $110 \times 10^{-7}/°$ C. to $145 \times 10^{-7}/°$ C., most preferably from $120 \times 10^{-7}/°$ C. to $140 \times 10^{-7}/°$ C. Further, $\alpha_H$ of the conventional glass is $137 \times 10^{-7}/°$ C., and $\alpha_H$ of the conventional crystallized glass is $65 \times 10^{-7}/°$ C.

As compared with the conventional crystallized glass, the crystallized glass of the present invention has expansion characteristics at a typical temperature where film forming is carried out in the production of a band pass filter for the WDM optical communication, i.e. at from 190 to 220° C., which are close to the expansion characteristics of the conventional glass, whereby adjustment of the film forming conditions is easy.

E of the crystallized glass of the present invention is preferably at least 85 GPa. If it is less than 85 GPa, warpage of the substrate at the time of the film formation is likely to be large.

The Vickers hardness $H_v$ of the crystallized glass of the present invention is preferably at least 650. If it is less than 650, cracking or chipping is likely to result at the time of polishing or cutting.

The absorptivity coefficient $\mu_{1550}$ for a light having a wavelength of 1550 nm, of the crystallized glass of the present invention, is preferably at most 0.03 $mm^{-1}$. If it exceeds 0.03 $mm^{-1}$, the application to a band pass filter for the WDM optical communication is likely to be difficult. More preferably, it is at most 0.02 $mm^{-1}$, more preferably at most 0.01 $mm^{-1}$, particularly preferably at most 0.005 $mm^{-1}$. Here, the absorptivity coefficient may, for example, be calculated from the transmittances of samples having different thicknesses and include items due to losses not accompanying energy absorption such as scattering.

Now, the first crystallized glass of the present invention will be described.

In the first crystallized glass of the present invention, precipitation of a crystal or solid solution of $Na_{4-x}K_xAl_4Si_4O_{16}$ ($1<x\leq 4$) (hereinafter generally referred to as "nepheline-kalsilite crystal") is essential. If no nepheline-kalsilite crystal is precipitated, it tends to be difficult to bring the expansion characteristics at at least 70° C., particularly $\alpha_H$, close to the conventional glass.

Further, in the first crystallized glass of the present invention, other crystals or solid solutions may be precipitated to such an extent not to impair the purpose of the present invention.

The first crystallized glass of the present invention is prepared typically as follows. Namely, raw materials are prepared and mixed, and then, the mixture is melted to obtain a molten glass. This molten glass is formed into a desired shape and after cooling, subjected to heat treatment to precipitate a crystal or solid solution such as the nepheline-kalsilite crystal.

The first crystallized glass of the present invention preferably consists, as represented by mol % based on the following oxides, essentially of from 30 to 65% of $SiO_2$, from 5 to 35% of $Al_2O_3$, from 1 to 15% of $TiO_2+ZrO_2$, from 0 to 30% of $Na_2O$, from 5 to 30%, of $K_2O$, from 0 to 15% of $Li_2O$, from 0 to 15% of $MgO$, from 0 to 15% of $CaO$, from 0 to 15% of $SrO$, from 0 to 15% of $BaO$, from 0 to 15% of $ZnO$, from 0 to 15% of $B_2O_3$, from 0 to 15% of $P_2O_5$ and from 0 to 15% of $Y_2O_3$.

Especially, the first crystallized glass of the present invention preferably consists, as represented by mol % based on the following oxides, essentially of from 44 to 55% of $SiO_2$, from 15 to 25% of $Al_2O_3$, from 2 to 10% of $TiO_2+ZrO_2$, from 0 to 20% of $Na_2O$, from 5 to 25% of $K_2O$, from 0 to 5% of $Li_2O$, from 0 to 10% of $MgO$, from 0 to 10% of $CaO$, from 0 to 10% of $SrO$, from 0 to 10% of $BaO$, from 0 to 10% of $ZnO$, from 0 to 10% of $B_2O_3$, from 0 to 5% of $P_2O_5$ and from 0 to 10% $Y_2O_3$.

Now, the above preferred embodiments will be described in which mol % will be represented simply by %.

$SiO_2$ is a network former and the main component of the nepheline-kalsilite crystal, and is thus essential. If the content is less than 30%, devitrification tends to be likely, or a dense nepheline-kalsilite crystal tends to be hardly obtainable. The content is preferably at least 35%, more preferably at least 40%, particularly preferably at least 44%. If the content exceeds 65%, the expansion coefficient such as $\alpha_L$ or $\alpha_H$ (hereinafter referred to simply as the expansion coefficient) or E tends to be small. The content is preferably at most 60%, more preferably at most 55%.

$Al_2O_3$ is a component to improve the chemical durability and the main component of the nepheline-kalsilite crystal and thus is essential. If the content is less than 5%, the nepheline-kalsilite crystal tends to hardly be precipitated. The content is preferably at least 10%, more preferably at least 13%, particularly preferably at least 15%. If the content exceeds 35%, melting of the glass tends to be difficult. The content is preferably at most 30%, more preferably at most 27%, particularly preferably at most 25%.

$TiO_2$ and $ZrO_2$ are nucleating agents to precipitate the nepheline-kalsilite crystal, and at least one of them is essential. If the total content of $TiO_2$ and $ZrO_2$ is less than 1%, precipitation of the nepheline-kalsilite crystal tends to be difficult. The total content is preferably at least 2%. If the total content exceeds 15%, melting of the glass tends to be difficult, or devitrification is likely to take place. The total content is preferably at most 10%.

$TiO_2$ is preferably at most 10%, more preferably at most 8%.

$ZrO_2$ is preferably at most 10%, more preferably at most 6%, particularly preferably at most 4%.

$Na_2O$ is not essential, but may be contained up to 30% in order to increase the expansion coefficient or to improve the melting property of the glass. If the content exceeds 30%, E tends to be small, or the chemical durability tends to deteriorate. The content is preferably at most 25%, more preferably at most 20%, particularly preferably at most 15%, most preferably at most 10%.

$K_2O$ is the main component of the nepheline-kalsilite crystal and a component to increase the expansion coefficient and is essential. If the content is less than 5%, precipitation of the nepheline-kalsilite crystal tends to be difficult. If the content exceeds 30%, E tends to be small, or the chemical durability tends to deteriorate. The content is preferably at most 25%, more preferably at most 20%.

$Li_2O$ is not essential, but may be contained up to 15% in order to improve the melting property of the glass, to increase the expansion coefficient or to increase E. If the content exceeds 15%, devitrification is likely to take place. The content is preferably at most 10%, more preferably at most 5%. When $Li_2O$ is contained, its content is preferably at least 0.5%. The content is more preferably at least 1%, particularly preferably at least 2%.

MgO is not essential, but may be contained up to 15% in order to improve the melting property of the glass or to increase E. If the content exceeds 15%, devitrification is likely to take place. The content is preferably at most 12%, more preferably at most 10%. In a case where MgO is contained, its content is preferably at least 1%. The content is more preferably at least 2%.

Each of CaO, SrO and BaO is not essential, but may be contained up to 15% each in order to improve the melting property of the glass or to increase the expansion coefficient. If the content exceeds 15%, respectively, devitrification is likely to take place, or the nepheline-kalsilite crystal tends to be hardly precipitated. The content is respectively preferably at most 12%, more preferably at most 10%. In a case where CaO, SrO or BaO is contained, the content is respectively preferably at least 1%, more preferably at least 2%.

ZnO is not essential, but may be contained up to 15% in order to improve the melting property of the glass or to increase E. If the content exceeds 15%, devitrification is likely to take place. The content is preferably at most 12%, more preferably at most 10%. In a case where ZnO is contained, its content is preferably at least 1%, more preferably at least 2%.

$B_2O_3$ is not essential, but may be contained up to 15% in order to improve the melting property of the glass. If the content exceeds 15%, E tends to be too small, or the chemical durability tends to deteriorate. The content is preferably at most 10%. In a case where $B_2O_3$ is contained, its content is preferably at least 0.1%, more preferably at least 1%, particularly preferably at least 3%. Further, in a case where it is desired to more improve the chemical durability, it is preferred that $B_2O_3$ is not substantially contained.

$P_2O_5$ is not essential, but may be contained up to 15% in order to accelerate nucleation to precipitate the nepheline-kalsilite crystal. If the content exceeds 15%, E tends to be too small, the melting property of the glass tends to deteriorate, or devitrification is likely to take place. The content is preferably at most 10%, more preferably at most 5%. In a case where $P_2O_5$ is contained, its content is preferably at least 1%. The content is more preferably at least 2%, particularly preferably at least 3%. However, in a case where it is desired to more improve the melting property of the glass or it is desired to increase E, it is preferred that $P_2O_5$ is not substantially contained.

$Y_2O_3$ is not essential, but may be contained up to 15% in order to improve the melting property of the glass or to increase E. If the content exceeds 15%, devitrification is likely to take place. The content is preferably at most 10%. In a case where $Y_2O_3$ is contained, its content is preferably at least 0.1%. The content is more preferably at least 1%, particularly preferably at least 3%.

In the above-mentioned preferred embodiment, the crystallized glass of the present invention consists essentially of the above-mentioned components, but other components may be contained within a range not to impair the purpose of the present invention. The total content of such other components is preferably at most 15%, more preferably at most 10%, particularly preferably at most 5%.

Such other components will be described as follows.

In order to increase E, the first crystallized glass of the present invention may contain at least one component selected from the group (hereinafter this group will be referred to as group A) consisting of $V_2O_5$, $Cr_2O_3$, MnO, $Fe_2O_3$, CoO, NiO, CuO, $Ga_2O_3$, $GeO_2$, $Nb_2O_5$, $MoO_3$, $La_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $HfO_2$, $Ta_2O_5$ and $WO_3$. Here, the total content of components of group A is preferably at most 15%. If the total content exceeds 15%, devitrification is likely to take place, or the expansion coefficient is likely to be small. The total content is more preferably at most 10%, particularly preferably at most 5%, most preferably at most 3%. In a case where components of group A are contained, their total content is at least 0.1%, more preferably at least 1%, particularly preferably at least 2%.

Further, as a clarifying agent, $SO_3$, $As_2O_5$, $Sb_2O_5$, F, Cl, etc. may be contained. The total content of such clarifying agents is preferably at most 2%. Particularly, the total content of $SO_3$, $As_2O_5$, $Sb_2O_5$, F and Cl is preferably at most 1.9%.

Further, it is preferred that PbO is not substantially contained.

Now, components of the second crystallized glass of the present invention will be described. Also here, mol % will be represented simply by %.

If $SiO_2$ is less than 35%, devitrification is likely to result, or the crystal or solid solution (hereinafter referred to as the crystal or the like) tends to be hardly precipitated. It is preferably at least 40%, more preferably at least 42%. If the content exceeds 60%, the expansion coefficient or E tends to be small. The content is more preferably at most 55%, preferably at most 53%.

If $Al_2O_3$ is less than 10%, the crystal or the like tends to be hardly precipitated. The content is preferably at least 15%, more preferably at least 17%. If the content exceeds 30%, melting of the glass tends to be difficult. The content is preferably at most 28%.

At least one of $TiO_2$ and $ZrO_2$ must be contained. If the total content of $TiO_2$ and $ZrO_2$ is less than 1%, the crystal or the like tends to be hardly precipitated. The total content is preferably at least 2%. If the total content exceeds 15%, melting of the glass tends to be difficult, or devitrification is likely to result. The total content is preferably at most 10%.

TiO$_2$ is preferably at most 10%.

ZrO$_2$ is preferably at most 10%, more preferably at most 6%, particularly preferably at most 2%.

If Na$_2$O is less than 4%, the crystal or the like tends to be hardly precipitated. The content is preferably at least 4.5%. If the content exceeds 20%, E tends to be small, or the chemical durability tends to deteriorate. The content is preferably at most 15%, more preferably at most 10%.

If K$_2$O is less than 4%, the crystal or the like tends to be hardly precipitated. The content is preferably at least 8%, more preferably at least 10%. If the content exceeds 20%, E tends to be small, or the chemical durability tends to deteriorate. The content is preferably at most 15%.

At least one of CaO, SrO and BaO must be contained. If the total content of CaO, SrO and BaO is less than 0.1%, the crystal or the like tends to be hardly precipitated. The total content is preferably at least 1%. If the total content exceeds 10%, devitrification is likely to result, or the crystal or the like rather tends to be hardly precipitated. The total content is preferably at most 8%, more preferably at most 7%.

MgO is not essential, but may be contained up to 1.0% in order to improve the melting property of the glass or to increase E. If the content exceeds 10%, devitrification is likely to result. The content is preferably at most 5%, more preferably at most 3%. In a case where MgO is contained, its content is preferably at least 1%, more preferably at least 2%.

B$_2$O$_3$ is not essential, but may be contained up to 10% in order to improve the melting property of the glass. If the content exceeds 10%, E tends to be too small, or the chemical durability tends to deteriorate. It is preferably at most 3%. In a case where B$_2$O$_3$ is contained, its content is preferably at least 0.1%. Further, in a case where it is desired to more improve the chemical durability, it is preferred that B$_2$O$_3$ is not substantially contained.

P$_2$O$_5$ is not essential, but may be contained up to 10% in order to accelerate nucleation to precipitate the crystal or the like. If the content exceeds 10%, E tends to be too small, the melting property of the glass tends to deteriorate, or devitrification is likely to result. The content is preferably at most 3%. In a case where P$_2$O$_5$ is contained, its content is preferably at least 1%. Further, in a case where it is desired to more improve the melting property of the glass, or more increase E, it is preferred that P$_2$O$_5$ is not substantially contained.

The second crystallized glass of the present invention consists essentially of the above-described components, but it may contain other components within a range not to impair the purpose of the present invention.

With respect to such other components, what is mentioned above about other components in the preferred embodiment of the first crystallized glass of the present invention, applies as it is.

A preferred embodiment of the first crystallized glass of the present invention or the second crystallized glass of the present invention, may, for example, be prepared as follows. Namely, the glass is melted and formed into a plate shape, followed by cooling to obtain a glass plate. Then, the glass plate is cut into a desired size. Then, the glass plate thus cut is maintained from 500° C. to 750° C. for from 1 hour to 5 hours to form crystal nuclei, and then heat treatment is carried out by maintaining the plate from 700° C. to 1000° C., more typically from 850° C. to 1000° C., from 1 hour to 5 hours to grow crystals, thereby to obtain a crystallized glass.

The optical filter of the present invention is prepared by forming a dielectric multilayer film by e.g. a vapor deposition method or a sputtering method on an optical filter substrate made of the crystallized glass of the present invention. The dielectric multilayer film is a film having a thin film of a high refractive index dielectric such as TiO$_2$ or Ta$_2$O$_5$ and a thin film of a low refractive index dielectric such as SiO$_2$ alternately laminated, and typically is a multilayer film of about 100 layers.

The optical filter of the present invention is suitable for a band pass filter to be used in the WDM optical communication system, an edge filter, a gain-flattening filter, a beam splitter, etc., but the use is not limited thereto.

Examples 1 to 40 shown in Tables 1 to 5 are Working Examples of the present invention, and Examples 41 and 42 are Comparative Examples representing the conventional crystallized glass and the conventional glass, which are respectively commercially available. Further, the composition shown in lines for from SiO$_2$ to B$_2$O$_3$, MgO, BaO or P$_2$O$_5$ in each Table is a composition represented by mol %.

With respect to Examples 1 to 40, the raw materials were blended, put into a platinum crucible, heated to 1650° C. and melted for 5 hours. At that time, the molten glass was stirred for 2 hours by a platinum stirrer and homogenized. Then, the molten glass was cast and formed into a plate shape, followed by annealing to obtain a glass plate. The glass plate was heated from room temperature to 500° C. at a rate of 300° C./hr, from 500° C. to 750° C. at a rate of 50° C./hr and from 750° C. to 900° C. at a rate of 300° C./hr and then maintained at 900° C. for 4 hours in Example 1 or for 1 hour in Examples 2 to 40, to carry out heat treatment.

With respect to Examples 1 to 42, the density d (unit: g/cm), E (unit: GPa), the expansion coefficients $\alpha_L$, $\alpha_{70}$, $\alpha_{100}$, $\alpha_{140}$ and $\alpha_H$ (unit: $10^{-7}$/° C.), $\mu 1550$ (unit: mm$^{-1}$), the internal transmittance T (unit: %) with a thickness of 1 mm, H$_v$, and the precipitated crystal, were measured or identified as follows. The results are shown in Tables. Symbol "-" in Tables shows that there was no data.

d: Measured by the Archimedes method.

E: With respect to a plate-shaped sample having a thickness of from 10 to 20 mm and a size of 4 cm×4 cm, polished so that both surfaces would be in parallel with each other, E was measured by an ultrasonic pulse method. However, with respect to Examples 33, 34 and 36 to 39, no such measurement was carried out, and E was obtained by calculation.

$\alpha_L$, $\alpha_{70}$, $\alpha_{100}$, $\alpha_{140}$ and $\alpha_H$: With respect to a sample processed into a cylindrical shape having a diameter of 5 mm and a length of 20 mm, the temperature was raised from −50° C. to +230° C. at a rate of 5° C./min by means of a thermomechanical analyzer (TMA8140, tradename, manufactured by Rigaku Corporation), and an expansion curve showing the relation of temperature-elongation, was obtained, whereupon the value was calculated from the expansion curve.

$\mu_{1550}$: With respect to each of a plate sample having a thickness of 1 mm and a size of 4 cm×4 cm and having both surfaces mirror-polished and the same plate sample as such a plate sample except that the thickness was 4 mm, the transmittance for a light having a wavelength of 1550 nm was measured by means of spectrophotometer (U-3500, tradename, Hitachi, Ltd.). From the transmittance T$_1$ at a thickness of 1 mm and the transmittance T$_4$ at a thickness of 4 mm, obtained by such measurements, it was calculated by the following formula.

$$\mu_{1550} = -\log_e(T_4/T_1)/3.$$

T: Calculated by the following formula $$T = 100 \times \exp(-\mu_{1550}).$$

$H_v$: Measured by pressing a Vickers indenter with a load of 1N against a plate sample having a thickness of 4 mm and a size of 4 cm×4 cm, polished so that both surfaces would be in parallel with each other.

Precipitated crystal: The presence or absence of precipitation of a crystal or solid solution was examined by an X-ray diffraction method. In the line for precipitated crystal in each Table, NK1 indicates precipitation of $Na_1K_3Al_4Si_4O_{16}$, NK2 indicates precipitation of $Na_2K_2Al_4Si_4O_{16}$, NK indicates precipitation of $Na_{4-x}K_xAl_4Si_4O_{16}$ ($1<x<2$, $2<x<3$ or $3<x\leq4$), and NKC indicates precipitation of a crystal or solid solution which is not NK1, NK2 or NK. Further, LiSi represents lithium disilicate.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ | 50.6 | 47.4 | 44.1 | 47.4 | 44.1 | 44.1 | 50.1 | 47.4 | 44.7 | 44.8 |
| $Al_2O_3$ | 22.2 | 23.7 | 25.3 | 23.7 | 25.3 | 25.3 | 22.0 | 23.7 | 25.1 | 24.6 |
| $TiO_2$ | 6.8 | 6.8 | 6.8 | 6.8 | 6.8 | 6.8 | 6.8 | 6.8 | 6.3 | 6.7 |
| $ZrO_2$ | 1.0 | 1.0 | 1.0 | 1.0 | 1.0 | 1.0 | 1.0 | 1.0 | 0.9 | 1.0 |
| $Na_2O$ | 9.7 | 9.1 | 8.4 | 9.1 | 8.4 | 4.2 | 9.7 | 4.5 | 4.5 | 4.8 |
| $K_2O$ | 9.7 | 9.1 | 8.4 | 9.1 | 8.4 | 12.7 | 9.7 | 13.6 | 13.5 | 14.3 |
| MgO | 0 | 3.0 | 6.0 | 0 | 0 | 6.0 | 0 | 0 | 5.1 | 4.0 |
| ZnO | 0 | 0 | 0 | 3.0 | 6.0 | 0 | 0 | 3.0 | 0 | 0 |
| $B_2O_3$ | 0 | 0 | 0 | 0 | 0 | 0 | 0.7 | 0 | 0 | 0 |
| d | 2.66 | 2.70 | 2.75 | 2.74 | 2.82 | 2.73 | 2.66 | 2.72 | 2.72 | 2.71 |
| E | 90 | 89 | 96 | 91 | 96 | 97 | 89 | 91 | 96 | 94 |
| $\alpha_L$ | 109 | 103 | 101 | 106 | 101 | 105 | 112 | 108 | 107 | 113 |
| $\alpha_{70}$ | 120 | 109 | 110 | 114 | 110 | 117 | 117 | 119 | 115 | 123 |
| $\alpha_{100}$ | 124 | 118 | 112 | 118 | 112 | 117 | 117 | 122 | 123 | 129 |
| $\alpha_{140}$ | 125 | 126 | 116 | 124 | 116 | 134 | 121 | 134 | 134 | 135 |
| $\alpha_H$ | 133 | 129 | 118 | 133 | 118 | 136 | 131 | 141 | 144 | 151 |
| $\mu_{1550}$ | 0.001 | 0.008 | 0.003 | 0.008 | 0.008 | 0.000 | 0.002 | 0.000 | 0.002 | 0.000 |
| T | 99.9 | 99.3 | 99.7 | 99.2 | 99.2 | 100 | 99.8 | 100 | 99.8 | 100 |
| $H_V$ | 800 | — | 780 | — | — | — | — | — | — | — |
| Precipitated crystal | NK2 | NK2 | NK2 | NK2 | NK2 | NK1 | NK2 | NK1 | NK1 | NK1 |

TABLE 2

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| $SiO_2$ | 44.7 | 48.8 | 48.8 | 49.2 | 46.3 | 48.0 | 46.4 | 47.4 | 46.9 | 49.6 |
| $Al_2O_3$ | 25.1 | 21.0 | 21.0 | 21.4 | 24.4 | 22.6 | 21.8 | 22.3 | 22.1 | 21.6 |
| $TiO_2$ | 6.3 | 6.3 | 6.3 | 6.8 | 6.8 | 6.8 | 10.0 | 8.0 | 9.0 | 9.0 |
| $ZrO_2$ | 0.9 | 0.9 | 0.9 | 1.0 | 1.0 | 1.0 | 1.0 | 1.0 | 1.0 | 1.0 |
| $Na_2O$ | 9.0 | 9.0 | 6.0 | 9.3 | 6.2 | 6.2 | 5.9 | 6.1 | 6.0 | 9.4 |
| $K_2O$ | 9.0 | 9.0 | 12.0 | 9.3 | 12.4 | 12.4 | 11.9 | 12.2 | 12.1 | 9.4 |
| MgO | 5.1 | 5.1 | 5.1 | 3.0 | 3.0 | 3.0 | 3.0 | 3.0 | 3.0 | 0 |
| d | 2.73 | 2.68 | 2.67 | 2.67 | 2.70 | 2.68 | 2.70 | 2.68 | 2.69 | 2.69 |
| E | 97 | 93 | 90 | 91 | 95 | 92 | 92 | 93 | 93 | 92 |
| $\alpha_L$ | 109 | 108 | 111 | 109 | 112 | 113 | 108 | 110 | 111 | 111 |
| $\alpha_{70}$ | 114 | 126 | 120 | 117 | 115 | 122 | 114 | 115 | 118 | 119 |
| $\alpha_{100}$ | 119 | 123 | 123 | 124 | 121 | 122 | 119 | 124 | 123 | 123 |
| $\alpha_{140}$ | 127 | 136 | 132 | 128 | 134 | 131 | 130 | 133 | 134 | 126 |
| $\alpha_H$ | 134 | 132 | 137 | 147 | 141 | 139 | 142 | 143 | 143 | 135 |
| $\mu_{1550}$ | 0.000 | 0.003 | 0.003 | 0.002 | 0.001 | 0.001 | 0.004 | 0.003 | 0.002 | 0.004 |
| T | 100 | 99.7 | 99.7 | 99.8 | 99.9 | 99.9 | 99.6 | 99.7 | 99.8 | 99.6 |
| $H_V$ | — | — | — | — | — | — | — | — | — | — |
| Precipitated crystal | NK2 | NK2 | NK | NK2 | NK | NK | NK | NK | NK | NK2 |

TABLE 3

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $SiO_2$ | 47.2 | 47.4 | 47.4 | 47.5 | 47.4 | 47.4 | 47.7 | 50.7 | 47.9 | 47.0 |
| $Al_2O_3$ | 22.2 | 22.3 | 22.3 | 22.4 | 22.3 | 22.3 | 22.4 | 22.2 | 22.6 | 21.5 |
| $TiO_2$ | 8.0 | 8.0 | 8.0 | 8.0 | 8.0 | 8.0 | 8.0 | 6.8 | 8.0 | 8.0 |
| $ZrO_2$ | 1.4 | 1.0 | 1.0 | 0.8 | 1.0 | 1.0 | 0.5 | 1.0 | 0 | 0 |
| $Na_2O$ | 6.1 | 5.2 | 4.8 | 6.1 | 4.6 | 7.3 | 6.1 | 4.9 | 6.2 | 7.0 |
| $K_2O$ | 12.1 | 13.1 | 13.5 | 12.3 | 13.7 | 11.0 | 12.3 | 14.6 | 12.4 | 13.5 |
| MgO | 3.0 | 3.0 | 3.0 | 3.0 | 3.0 | 3.0 | 3.0 | 0 | 3.0 | 3.0 |
| d | 2.70 | 2.68 | 2.68 | 2.68 | 2.68 | 2.68 | 2.67 | 2.64 | 2.65 | 2.66 |
| E | 93 | 92 | 92 | 93 | 92 | 93 | 92 | 88 | 92 | 92 |
| $\alpha_L$ | 109 | 114 | 113 | 111 | 110 | 112 | 112 | 112 | 112 | 121 |
| $\alpha_{70}$ | 122 | 122 | 123 | 121 | 118 | 119 | 117 | 120 | 123 | 129 |
| $\alpha_{100}$ | 120 | 124 | 125 | 121 | 125 | 121 | 124 | 127 | 127 | 134 |
| $\alpha_{140}$ | 132 | 133 | 134 | 133 | 133 | 131 | 135 | 132 | 132 | 139 |

TABLE 3-continued

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $\alpha_H$ | 147 | 147 | 143 | 140 | 146 | 136 | 144 | 147 | 145 | 151 |
| $\mu_{1550}$ | 0.004 | 0.001 | 0.001 | 0.001 | 0.002 | 0.003 | 0.001 | 0.001 | 0.002 | 0.001 |
| T | 99.6 | 99.9 | 99.9 | 99.9 | 99.8 | 99.7 | 99.9 | 99.9 | 99.8 | 100 |
| $H_V$ | — | — | — | — | — | — | — | — | — | — |
| Precipitated crystal | NK | NK | NK1 | NK | NK1 | NK | NK | NK1 | NK | NK |

TABLE 4

|  | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|
| $SiO_2$ | 48.9 | 43.8 | 44.9 | 45.9 | 45.9 | 45.9 | 45.9 | 45.1 | 45.5 | 45.4 |
| $Al_2O_3$ | 23.1 | 26.0 | 22.6 | 21.6 | 22.6 | 21.6 | 21.6 | 22.3 | 21.8 | 22.3 |
| $TiO_2$ | 7.0 | 6.8 | 8.0 | 8.0 | 8.0 | 8.0 | 8.0 | 8.0 | 8.0 | 8.0 |
| $ZrO_2$ | 1.0 | 1.0 | 0 | 0 | 0 | 0 | 0 | 0 | 0 | 0 |
| $Na_2O$ | 6.7 | 6.5 | 6.2 | 6.2 | 6.2 | 5.2 | 6.2 | 6.2 | 6.2 | 6.1 |
| $K_2O$ | 13.3 | 12.9 | 12.4 | 12.4 | 12.4 | 10.4 | 12.4 | 12.4 | 12.5 | 12.2 |
| MgO | 0 | 0 | 3.0 | 3.0 | 3.0 | 3.0 | 3.0 | 3.0 | 3.0 | 3.0 |
| SrO | 0 | 0 | 0 | 0 | 0 | 0 | 3.0 | 3.0 | 0 | 0 |
| BaO | 0 | 3.0 | 3.0 | 3.0 | 2.0 | 6.0 | 0 | 0 | 3.0 | 3.0 |
| d | 2.66 | 2.78 | 2.78 | 2.75 | 2.74 | 2.85 | 2.72 | 2.73 | 2.76 | 2.76 |
| E | 91 | 92 | 90 | 92 | 95 | 95 | 90 | 92 | 96 | 97 |
| $\alpha_L$ | 113 | 109 | 115 | 115 | 105 | 103 | 117 | 114 | 116 | 111 |
| $\alpha_{70}$ | 122 | 112 | 125 | 121 | 119 | 117 | 122 | 128 | 121 | 119 |
| $\alpha_{100}$ | 126 | 119 | 124 | 126 | 117 | 117 | 125 | 124 | 122 | 124 |
| $\alpha_{140}$ | 138 | 123 | 133 | 130 | 124 | 124 | 132 | 132 | 132 | 127 |
| $\alpha_H$ | 146 | 128 | 140 | 139 | 133 | 140 | 140 | 138 | 141 | 135 |
| $\mu_{1550}$ | 0.001 | — | — | — | 0.001 | — | — | — | — | <0.001 |
| T | 99.9 | — | — | — | 99.9 | — | — | — | — | 100 |
| $H_V$ | — | — | — | — | — | — | — | — | — | — |
| Precipitated crystal | NK | NKC | NKC | NKC | NKC | NKC | NKC | NKC | NKC | NKC |

TABLE 5

|  | Ex. 41 | Ex. 42 |
|---|---|---|
| $SiO_2$ | 74.1 | 47.3 |
| $Al_2O_3$ | 4.0 | 0 |
| $TiO_2$ | 0 | 24.2 |
| $ZrO_2$ | 0.6 | 0 |
| $Na_2O$ | 0 | 15.6 |
| $K_2O$ | 1.2 | 6.3 |
| $Li_2O$ | 18.1 | 4.6 |
| MgO | 1.1 | 0.2 |
| BaO | 0 | 1.8 |
| ZnO | 0.4 | 0 |
| $P_2O_5$ | 0.4 | 0 |
| d | 2.49 | 2.86 |
| E | 96 | 83 |
| $\alpha_L$ | 111 | 104 |
| $\alpha_{70}$ | 137 | 105 |
| $\alpha_{100}$ | 128 | 127 |
| $\alpha_{140}$ | 97 | 135 |
| $\alpha_H$ | 65 | 137 |
| $\mu_{1550}$ | 0.004 | — |
| T | 99.6 | — |
| $H_V$ | 760 | — |
| Precipitated crystal | LiSi | — |

INDUSTRIAL APPLICABILITY

According to the present invention, it is possible to provide an optical filter substrate whereby in the production of a band pass filter to be used for the WDM optical communication system, film forming can be carried out in the same manner as for a glass substrate made of the conventional glass and a change by temperature of the wavelength passing through the band pass filter can be suppressed, and which has large E. Further, it is possible to provide an optical filter substrate having a small absorptivity coefficient i.e. a large internal transmittance, or an optical filter substrate having high hardness.

The crystallized glass of the present invention has large E, whereby warpage of the substrate after the film formation can be minimized, and as a result, polishing or cutting of the substrate after the film formation will be easy.

Further, the crystallized glass of the present invention has high hardness, whereby cracking or chipping of the substrate at the time of polishing or cutting can be reduced.

The optical filter of the present invention is capable of presenting a filter for optical communication whereby the temperature dependency of the transmitting wavelength is small, and the wavelength interval is small and the multiplicity is large.

The entire disclosure of Japanese Patent Application No. 2001-160126 filed on May 29, 2001 including specification, claims and summary are incorporated herein by reference in its entirety.

What is claimed is:

1. A crystallized glass for an optical filter substrate, which consists, as represented by mol % based on the following oxides, essentially of:
   $SiO_2$: 30 to 65%,
   $Al_2O_3$: 5 to 35%,
   $TiO_2+ZrO_2$: 1 to 15%,
   $Na_2O$: 0 to 30%,
   $K_2O$: 5 to 30%, provided $K_2O$ (%) $\geq Na_2O$ (%),
   $Li_2O$: 0 to 15%,
   MgO: 0 to 15%,
   CaO: 0 to 15%,
   SrO: 0 to 15%,
   BaO: 0 to 15%, ZnO: 0 to 15%,
B$_2$O$_3$: 0 to 15%,
P$_2$O$_5$: 0 to 15%,
Y$_2$O$_3$: 0 to 15%,
and which has an average linear expansion coefficient α$_L$ of from 95×10$^{-7}$/° C. to 130×10$^{-7}$/° C. at from −30° C. to 70° C., and which has a crystal or solid solution of Na$_{4-x}$K$_x$Al$_4$Si$_4$O$_{16}$ (1<x≦4) precipitated therein.

2. The crystallized glass for an optical filter substrate according to claim 1, wherein MgO: 1 to 15%.

3. The crystallized glass for an optical filter substrate according to claim 1, which has an average linear expansion coefficient α$_H$ of from 80×10$^{-7}$/° C. to 155×10$^{-7}$/° C. at from 190° C. to 220° C.

4. The crystallized glass for an optical filter substrate according to claim 1, which has an average linear expansion coefficient α$_H$ of from 110×10$^{-7}$/° C. to 145×10$^{-7}$/° C.

5. The crystallized glass for an optical filter substrate according to claim 1, which has a Young's modulus of at least 85 GPa.

6. The crystallized glass for an optical filter substrate according to claim 1, which has an absorptivity coefficient of at most 0.03 mm$^{-1}$ for a light having a wavelength of 1550 nm.

7. An optical filter comprising
an optical filter substrate made of a crystallized glass for an optical filter substrate, which has an average linear expansion coefficient α$_L$ of from 95×10$^{-7}$/° C. to 130×10$^{-7}$/° C. at from −30° C. to 70° C. and which has a crystal or solid solution of Na$_{4-x}$K$_x$Al$_4$Si$_4$O$_{16}$ (1<x≦4) precipitated therein; and
a dielectric multilayer film formed on the substrate, wherein
the crystallized glass consists, as represented by mol % based on the following oxides, essentially of:
SiO$_2$: 30 to 65%,
Al$_2$O$_3$: 5 to 35%,
TiO$_2$+ZrO$_2$: 1 to 15%,
Na$_2$O: 0 to 30%,
K$_2$O: 5 to 30%, provided K$_2$O (%)≧Na$_2$O (%),
Li$_2$O: 0 to 15%,
MgO: 0 to 15%,
CaO: 0 to 15%,
SrO: 0 to 15%,
BaO: 0 to 15%,
ZnO: 0 to 15%,
B$_2$O$_3$: 0 to 15%,
P$_2$O$_5$: 0 to 15%,
Y$_2$O$_3$: 0 to 15%,
and which has an average linear expansion coefficient α$_L$ of from 95×10$^{-7}$/° C. to 130×10$^{-7}$/° C. at from −30° C. to 70° C., and which has a crystal or solid solution of Na$_{4-x}$K$_x$Al$_4$Si$_4$O$_{16}$ (1<x≦4) precipitated therein.

8. The optical filter according to claim 7, wherein MgO: 1 to 15%.

9. A crystallized glass for an optical filter substrate, which consists, as represented by mol % based on the following oxides, essentially of:
SiO$_2$: 35 to 60%,
Al$_2$O$_3$: 10 to 30%,
TiO$_2$+ZrO$_2$: 1 to 15%,
Na$_2$O: 4 to 20%,
K$_2$O: 4 to 20%,
CaO+SrO+BaO: 0.1 to 10%,
MgO: 0 to 10%,
B$_2$O$_3$: 0 to 10%,
P$_2$O$_5$: 0 to 10%,
and which has an average linear expansion coefficient α$_L$ of from 95×10$^{-7}$/° C. to 130×10$^{-7}$/° C. at from −30° C. to 70° C., and which has a crystal or solid solution of precipitated therein.

10. The crystallized glass for an optical filter substrate according to claim 9, wherein K$_2$O (%)≧Na$_2$O (%).

11. The crystallized glass for an optical filter substrate according to claim 9, wherein MgO: 1 to 15%.

12. The crystallized glass for an optical filter substrate according to claim 9, which has an average linear expansion coefficient α$_H$ of from 80×10$^{31\ 7}$/° C. to 155×10$^{-7}$/° C. at from 190° C. to 220° C.

13. The crystallized glass for an optical filter substrate according to claim 9, which has an average linear expansion coefficient α$_H$ of from 110×10$^{-7}$/° C. to 145×10$^{-7}$/° C.

14. The crystallized glass for an optical filter substrate according to claim 9, which has a Young's modulus of at least 85 GPa.

15. The crystallized glass for an optical filter substrate according to claim 9, which has an absorptivity coefficient of at most 0.03 mm$^{-1}$ for a light having a wavelength of 1550 nm.

16. An optical filter comprising
an optical filter substrate made of a crystallized glass for an optical filter substrate, which consists, as represented by mol % based on the following oxides, essentially of:
SiO$_2$: 35 to 60%,
Al$_2$O$_3$: 10 to 30%,
TiO$_2$+ZrO$_2$: 1 to 15%,
Na$_2$O: 4 to 20%,
K$_2$O: 4 to 20%,
CaO+SrO+BaO: 0.1 to 10%,
MgO: 0 to 10%,
B$_2$O$_3$: 0 to 10%,
P$_2$O$_5$: 0 to 10%,
and which has an average linear expansion coefficient α$_L$ of from 95×10$^{-7}$/° C. to 130×10$^{-7}$/° C. at from −30° C. to 70° C., and which has a crystal or solid solution of precipitated therein; and
a dielectric multilayer film formed on the substrate.

17. The optical filter according to claim 16, wherein the crystallized glass has K$^2$O (%)≧Na$_2$O (%).

18. The optical filter according to claim 16, wherein the crystallized glass has MgO: 1 to 15%.

19. The optical filter according to claim 16, wherein the crystallized glass has an average linear expansion coefficient α$_H$ of from 80×10$^{-7}$/° C. to 155×10$^{-7}$/° C. at from 190° C. to 220° C.

20. The optical filter according to claim 16, wherein the crystallized glass has an average linear expansion coefficient α$_H$ of from 110×10$^{-7}$/° C. to 145×10$^{-7}$/° C.

21. The optical filter according to claim 16, wherein the crystallized glass has a Young's modulus of at least 85 GPa.

22. The optical filter according to claim 16, wherein the crystallized glass has an absorptivity coefficient of at most 0.03 mm$^{-1}$ for a light having a wavelength of 1550 nm.

23. The crystallized glass for an optical filter substrate according to claim 1, wherein K$_2$O (%)≧1.5 Na$_2$O (%).

24. The optical filter according to claim 7, wherein K$_2$O (%)≧1.5 Na$_2$O (%).

25. The crystallized glass for an optical filter substrate according to claim 10, wherein K$_2$O (%)≧1.5 Na$_2$O (%).

26. The optical filter according to claim 17, wherein the crystallized glass has K$_2$O (%)≧1.5 Na$_2$O (%).

* * * * *